US012803804B2

(12) United States Patent
Oubre

(10) Patent No.: US 12,803,804 B2
(45) **Date of Patent: *Nov. 17, 2026**

(54) METHOD FOR DATA COMPRESSION AND ENCRYPTION

(71) Applicant: Derek Oubre, Mount Vernon, NY (US)

(72) Inventor: Derek Oubre, Mount Vernon, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 19/172,186

(22) Filed: Apr. 7, 2025

(65) Prior Publication Data

US 2025/0240166 A1 Jul. 24, 2025

Related U.S. Application Data

(63) Continuation-in-part of application No. 17/978,139, filed on Oct. 31, 2022, now Pat. No. 12,326,952.

(51) Int. Cl.
*H04L 9/32* (2006.01)

(52) U.S. Cl.
CPC .................................... *H04L 9/32* (2013.01)

(58) Field of Classification Search
CPC ...................................................... H04L 63/20
USPC ........................................................ 713/168
See application file for complete search history.

(56) References Cited

U.S. PATENT DOCUMENTS

| | | | | |
|---|---|---|---|---|
| 7,536,016 | B2 * | 5/2009 | Benaloh | H04L 9/0836 713/193 |
| 10,310,774 | B2 * | 6/2019 | Chhabra | G06F 12/145 |
| 2009/0196417 | A1 * | 8/2009 | Beaver | G06F 21/80 380/45 |
| 2017/0126642 | A1 * | 5/2017 | Basin | H04L 9/302 |
| 2018/0018469 | A1 * | 1/2018 | Moss | H04L 9/14 |
| 2018/0280698 | A1 * | 10/2018 | Steinke | A61N 1/36128 |
| 2024/0015026 | A1 * | 1/2024 | Armleder | H04L 9/3249 |

* cited by examiner

*Primary Examiner* — Anthony D Brown
(74) *Attorney, Agent, or Firm* — ASHLEY LAW FIRM P.C.; Stephen S. Ashley, Jr.

(57) ABSTRACT

A method for combining multiple and distinct databases into at least one encrypted and compressed embedded key having multiple numerical representations. The method is usable with any database. Further, the method, includes generating encrypted compressed organization keys which are joined with encrypted compression keys to, in essence, add a layer of encryption to compression and a layer of compression to encryption.

2 Claims, 16 Drawing Sheets

METHOD FOR DATA COMPRESSION AND ENCRYPTION

CROSS REFERENCE TO RELATED APPLICATION

This application is a continuation-in-part of and claims priority to co-pending U.S. application Ser. No. 17/978,139 filed Oct. 31, 2022, which is incorporated by reference herein in its entirety.

FIELD

This disclosure is related generally to a method of data compression and data encryption.

BACKGROUND

For many years, multiple theories have been set forth to compress and/or encrypt data. With respect to compression, the prior art has focused on the mathematical manipulation of a database. For example, "lossy compression" reduces the amount of data by removing unnecessary information or information deemed less important. "Lossless compression" reduces bits by identifying and eliminating statistical redundancy without losing information. With respect to encryption, the prior art falls generally into two types. Asymmetric encryption works with public and private keys. Symmetric encryption works by the transfer of a secret key. The secret key is sent by way of a separate channel, e.g. an email sent prior to a conference.

It is known that conventional compression and encryption methods can operate separately to transfer compressed and/or encrypted data on the internet. The present application is directed to a method for both compression and encryption wherein the method may be used for any type of database.

SUMMARY

The compression and simultaneous or contemporaneous encryption method described herein is usable for any database or multiple databases having bytes, characters, digits, hexadecimals, or any other type of unit used to represent a thought, image or sound. The databases may include any data and may be of any size. Further, the databases may contain picture, video, text, voice, or any other type of information.

The basic method steps include grouping the data by use and then organizing the data into a block or blocks of data. Prime numbers are organized into a block or blocks of prime numbers. The organization of prime numbers is saved. The block or blocks of data are aligned with the block or blocks of prime numbers. The method steps include mapping the positional redundancy of the block or blocks of data to the block or blocks of prime numbers.

One or more encrypted compression key(s) are derived or created after the mapping of the positional redundancy of the block(s) of data to the block(s) of prime numbers. The saved organization of prime numbers is used in the derivation of an encrypted compression key D and/or an encrypted organization key O. A double encrypted master key M may be formed by merging the encrypted compression key D to the encrypted organization key O. The method steps include the deletion of the original database before the transfer of either the encrypted compression key D, the encrypted organization key O, or the double encrypted master key M.

The method does not transform the database, or irrevocably delete any of its parts. Instead, the mapping of the positional redundancy of data to prime numbers, and the saving of the organization of the prime numbers, allows for the creation or derivation of an encrypted compression key, or an encrypted organization key, or a master key. The methodology maps the database to prime numbers and then uses the properties of the prime numbers to create one or more keys that can be reversed mathematically. The methodology also provides a mechanism for simultaneously or contemporaneously compressing and encrypting the database.

The method, in essence, adds a layer of encryption to the compression, and a layer of compression to the encryption. Encryption and compression occurs from mapping the data to prime numbers and saving the organization of prime numbers. Double encryption and compression occurs with the use of a trap door, or a one-way function, in both the compression and encryption parts of the method.

The method includes the steps of organizing original data into block(s) of data; organizing prime numbers into block(s) of prime numbers; aligning the block(s) of data with the block(s) of prime numbers; saving the organization of the prime numbers; and mapping the positional redundancy of the block(s) of data to the block(s) of prime numbers. Further, adding encryption to the compression process; adding compression to the encryption process; and adding trap door functionality, are also method steps that are believed to distinguish over the prior art.

A method, as disclosed herein, is also provided for combining two or more distinct databases into at least one encrypted and compressed "embedded" key, which includes two or more numerical representations.

These and other aspects of the present invention will be understood from the following detailed description of the embodiments and the appended claims with the drawings.

DETAILED DESCRIPTION

Reference will now be made to the drawings where embodiments of the method of the present invention are illustrated. It will be apparent to one of ordinary skill in the art that various modifications and variations can be made in the present invention without departing from the scope of the present invention. It is intended that the present invention covers such modifications and variations as exist within the scope of the appended claims and their equivalents.

Figure 1:
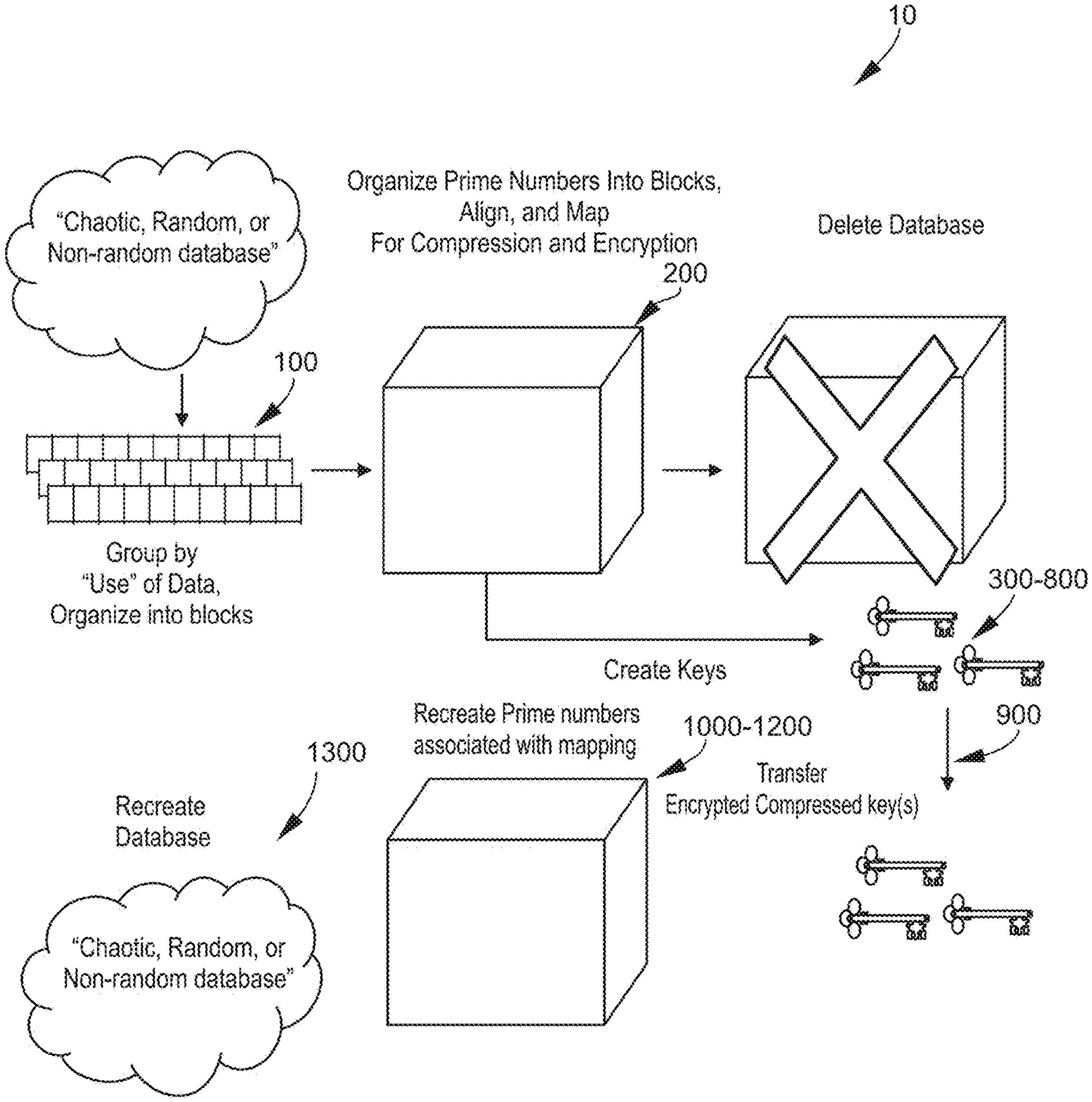
FIG. 1 illustrates in block diagram form, a method of the present invention for encrypting, compressing, decompressing, and unencrypting a database.

FIG. 1 shows a schematic overview 10 of a method of the present invention in block diagram form. The method described herein can be generally summarized as follows:

a. The method of the present invention is directed to the simultaneous or contemporaneous encryption and compression of a selected database. A database, as used herein, refers to bits, bytes, characters, digits, hexadecimals, or any other type of unit used to represent a thought, image or sound. The database may include any data and may be of any size. Databases may contain picture, video, text, voice, or any other type of information. As illustrated at 100 in FIGS. 1 and 2, the method starts by grouping the data by use and then organizing the data into a block or blocks of data as illustrated in FIG. 3.

b. As shown at 200 in FIGS. 1 and 4, prime numbers are organized into a matrix of block(s) of prime numbers. The organization of prime numbers may be saved. The block or blocks of data are aligned with the block or blocks of prime numbers. The next step in the method includes mapping the positional redundancy of the block or blocks of data to the block or blocks of prime numbers.

c. The present invention does not transform the database, or irrevocably delete any of its parts before transmission. Instead, as shown in FIG. 1, keys (300-800) are created; the original database is deleted prior to transmission (900); the prime numbers associated with mapping are recreated after transmission (1000-1200); and the database is recreated (1300).

d. One or more encrypted compressed key(s) are derived or created after the mapping of the positional redundancy of the block(s) of data to the block(s) of prime numbers. Further, the saved organization of prime numbers is used in the deriving of an encrypted compression key D and an encrypted organization key O. A double encrypted master key M is formed by merging the encrypted compression key D to the encrypted organization key O. The present invention provides simultaneous or contemporaneous compression and encryption of any database.

Figure 2:
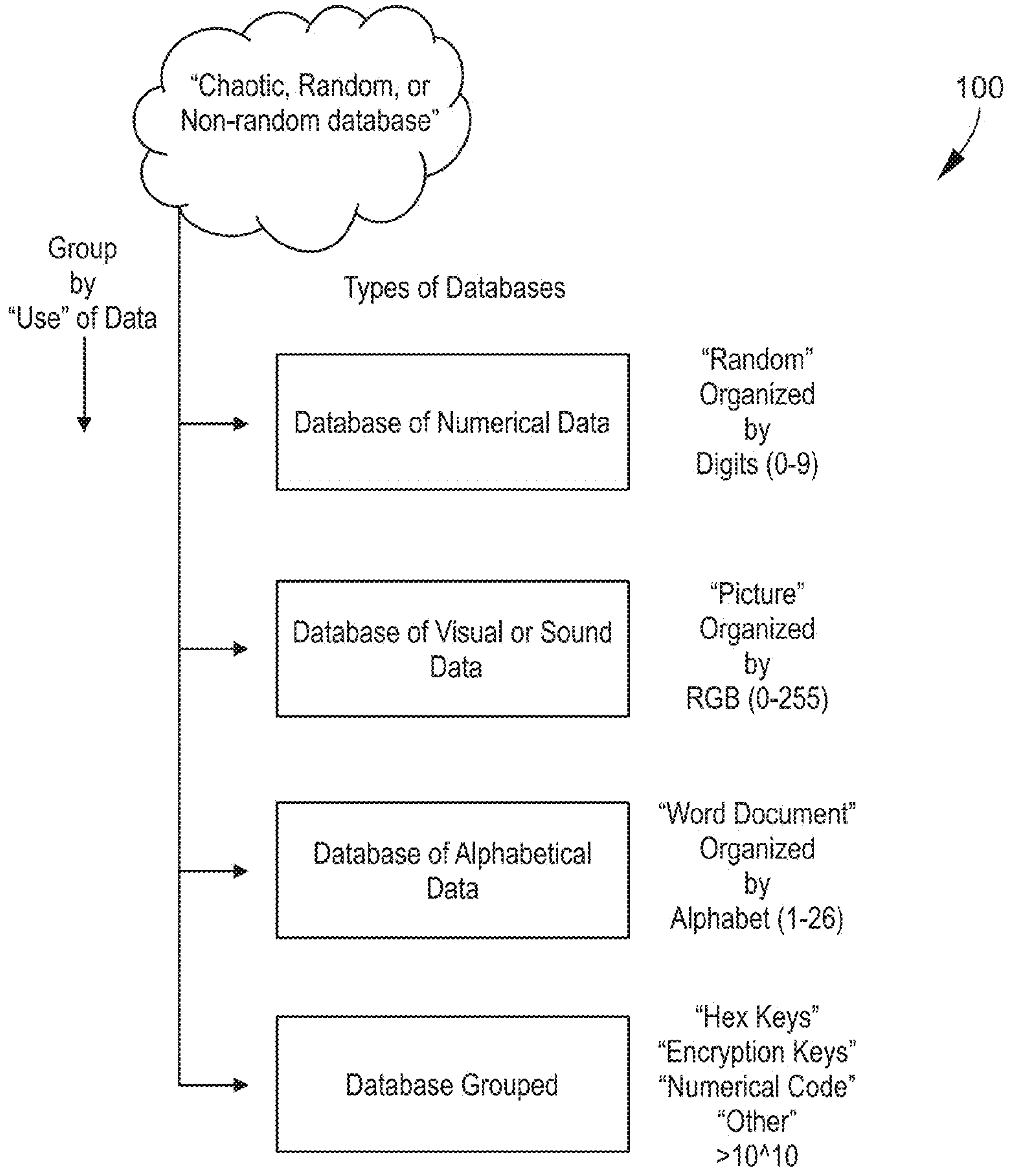
FIG. 2 illustrates in block diagram form, the grouping of databases by use.
Figure 3:
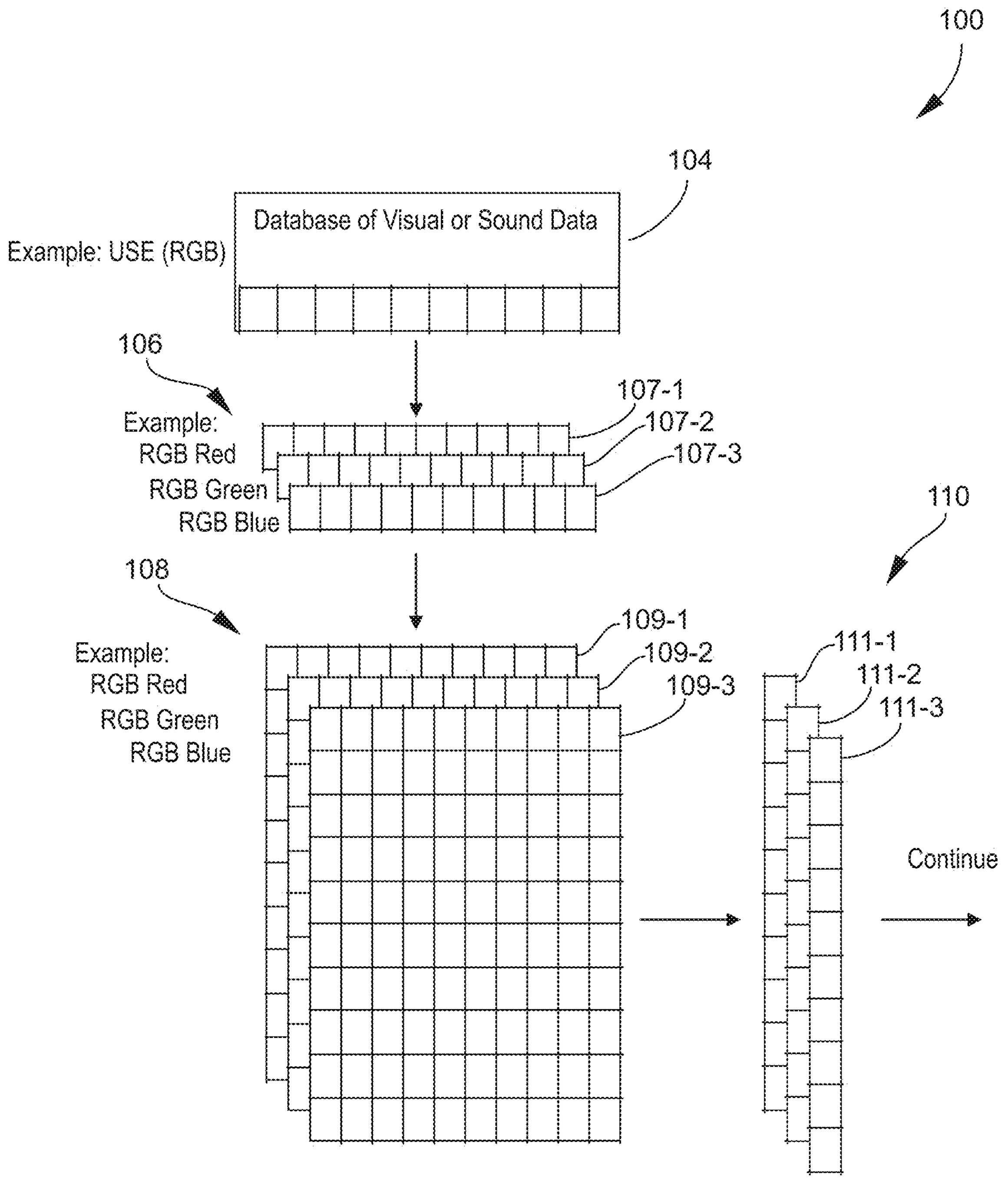
FIG. 3 illustrates in block diagram form, the organization of a database into a plurality of blocks that are grouped by use.

FIG. 2 and FIG. 3 are block diagrams (100) illustrating a database that is grouped by use of data and organized into blocks. This method step may be illustrated using a common database associated with a picture frame. The frame is a JPEG file and is a picture of the inside of a home, and thus is named the "Home pic". The Home pic is already a compressed file. The methodology described herein works regardless of raw data or any redundancy. Therefore, it does not matter whether the data is numerical, contained in an original picture, a compressed picture, or any other type of database.

Generally, a color image file includes four sets of pixel values—one for red, one for green, one for blue, and one labeled "A". Pixel values are commonly referred to as "RGB" numbers. The parameter "A" stands for alpha, which is the transparency channel. For a 24-bit color image, each color set includes pixel (RGB) values that range from 0 to 255.

Given that the file contains three channels, each of the RGB numbers ranging from 0-255, the database is grouped to maintain its natural structure. Each channel is split and placed into its own column—thus creating a sub-database with three columns. An index is added to the structure. The first 10 RGB numbers are shown explicitly.

| Index | Red | Green | Blue |
|---|---|---|---|
| 0 | 202 | 183 | 127 |
| 1 | 205 | 184 | 129 |
| 2 | 204 | 183 | 128 |
| 3 | 204 | 181 | 127 |
| 4 | 206 | 183 | 131 |
| 5 | 207 | 184 | 132 |
| 6 | 204 | 183 | 130 |
| 7 | 204 | 183 | 130 |
| 8 | 205 | 184 | 127 |
| 9 | 205 | 184 | 127 |

| Index | Red | Green | Blue |
|---|---|---|---|
| 90 | 217 | 193 | 145 |
| 91 | 217 | 190 | 143 |
| 92 | 217 | 189 | 142 |
| 93 | 218 | 191 | 144 |
| 94 | 218 | 191 | 144 |
| 95 | 212 | 190 | 140 |
| 96 | 213 | 191 | 141 |
| 97 | 214 | 192 | 135 |
| 98 | 214 | 193 | 136 |
| 99 | 214 | 193 | 136 |

FIG. 3 further illustrates step 100 of method 10. Since the Home pic file is grouped naturally into RGB numbers ranging from 0-255, FIG. 3 illustrates how the database can be further organized. In this example, each color is separated into a separate database and then organized into blocks of data, such as ten (10) blocks or columns of 10 numbers. The table below displays the data of the red column (100 RGB numbers) organized into blocks of 10 numbers each.

| Red RGB numbers: | | | | | | | | | |
|---|---|---|---|---|---|---|---|---|---|
| Block 1 | Block 2 | Block 3 | Block 4 | Block 5 | Block 6 | Block 7 | Block 8 | Block 9 | Block 10 |
| 202 | 205 | 207 | 209 | 215 | 211 | 213 | 212 | 219 | 217 |
| 205 | 205 | 210 | 209 | 214 | 211 | 213 | 212 | 217 | 217 |
| 204 | 205 | 210 | 206 | 213 | 210 | 210 | 209 | 217 | 218 |
| 204 | 207 | 211 | 209 | 212 | 211 | 208 | 207 | 216 | 218 |
| 206 | 207 | 206 | 212 | 212 | 212 | 211 | 209 | 215 | 212 |
| 207 | 208 | 208 | 213 | 211 | 211 | 211 | 210 | 216 | 213 |
| 204 | 208 | 209 | 210 | 211 | 212 | 211 | 211 | 218 | 214 |
| 204 | 208 | 208 | 207 | 211 | 210 | 212 | 213 | 215 | 214 |
| 205 | 205 | 208 | 207 | 207 | 210 | 213 | 215 | 215 | 214 |
| 205 | 203 | 208 | 208 | 208 | 212 | 213 | 218 | 217 | 214 |

In the above example, the top left number (202) is the pixel value for the red component of the top left pixel of the image. The number below the top left number (205) is the pixel value for the red component of the adjacent pixel (adjacent in the same row). Thus, in the example above, the 100 numbers illustrated are the pixel values for the red component of the first 100 pixels in the first row of the image. The next block would be the next 100 pixels. The rest of the data of the image is organized in a similar fashion.

Figure 4:
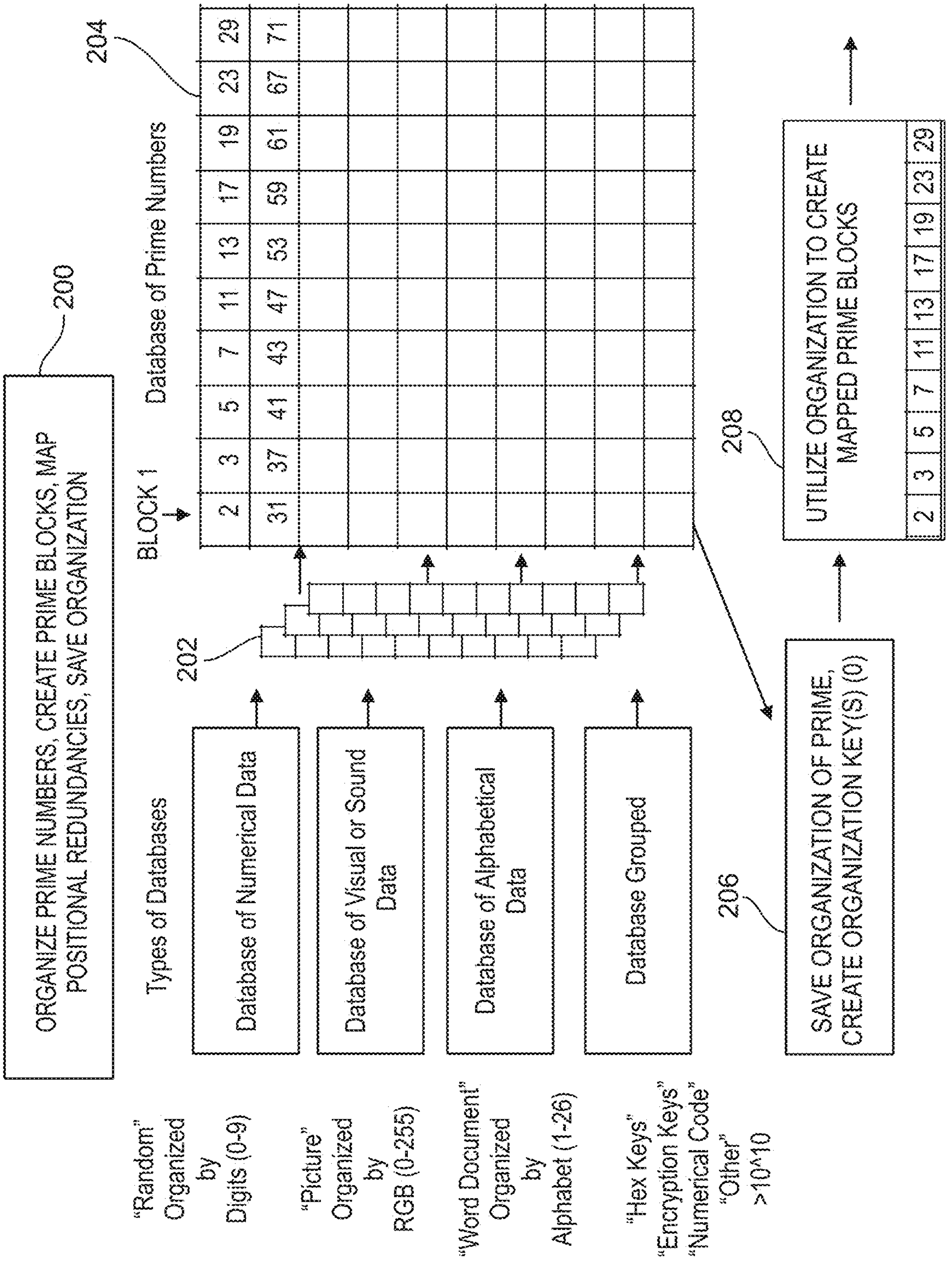
FIG. 4 illustrates in block diagram form, the organization of prime numbers, mapping of positional redundancies, and the saving of the organization of prime numbers.

FIG. 4 illustrates step grouping 200 of the method 10. The method organizes original data into a block or blocks of data, as previously described; organizes prime numbers into a block or blocks of non-contiguous prime numbers (204); saves the organization of prime numbers (206); and maps the positional redundancy of the blocks of data to the blocks of prime numbers (208). As illustrated, the organization of prime numbers is used in the creation of mapped prime number blocks and in the creation of an organization key(s) O.

The first encryption of the original data occurs at this point in the method. Mapping the positional redundancy of the original database to a database of prime numbers associates an individual prime number with each position. Reversal of the protocol occurs by finding the Prime Product of each group, all groups, or combinations, and dividing this number by each prime number in the associated block, group, or combination. Since prime factorization is difficult, the inclusion of scrambling of the organization in the present method provides encryption to the original data.

By way of example, the table below presents a database of prime numbers organized in a zig-zag pattern. The organization of the prime numbers differs from the organization of the data, and flows as follows:

Pattern: 

Prime Numbers:

| Block 1 | Block 2 | Block 3 | Block 4 | Block 5 | Block 6 | Block 7 | Block 8 | Block 9 | Block 10 |
|---|---|---|---|---|---|---|---|---|---|
| 2 | 3 | 5 | 7 | 11 | 13 | 17 | 19 | 23 | 29 |
| 31 | 37 | 41 | 43 | 47 | 53 | 59 | 61 | 67 | 71 |
| 73 | 79 | 83 | 89 | 97 | 101 | 103 | 107 | 109 | 113 |
| 127 | 131 | 137 | 139 | 149 | 151 | 157 | 163 | 167 | 173 |
| 179 | 181 | 191 | 193 | 197 | 199 | 211 | 223 | 227 | 229 |
| 233 | 239 | 241 | 251 | 257 | 263 | 269 | 271 | 277 | 281 |
| 283 | 293 | 307 | 311 | 313 | 317 | 331 | 337 | 347 | 349 |
| 353 | 359 | 367 | 373 | 379 | 383 | 389 | 397 | 401 | 409 |
| 419 | 421 | 431 | 433 | 439 | 443 | 449 | 457 | 461 | 463 |
| 467 | 479 | 487 | 491 | 499 | 503 | 509 | 521 | 523 | 541 |

Each column of data is placed into a block and this structure is used to map positional redundancies. An illustration of the mapping of positional redundancy of block 1 of the original database to block 1 of the prime database is shown below. The following is only one example of the mapping of positional redundancy.

| Red RGB numbers: Block 1 | | Prime Numbers Block 1 |
|---|---|---|
| 202 | → | 2 |
| 205 | → | 31 |
| 204 | → | 73 |
| 204 | → | 127 |
| 206 | → | 179 |
| 207 | → | 233 |
| 204 | → | 283 |
| 204 | → | 353 |
| 205 | → | 419 |
| 205 | → | 467 |

At this point in the methodology, the saved organization of prime numbers (the "data") is encrypted and can now be compressed. The "data" can be compressed and turned into a key such as key D. The key (D), that is created by the present method, is automatically encrypted. Further, the key, that is created, has an automatic trap door or one-way functionality which is part of the formation of the encrypted compression key D. A second related trap door functionality is used in the creation of an encrypted organization key O. Further, trap door functionality is used in the joining of keys D and O to form a double encrypted compressed master key M. The two keys D and O may be merged to form a double encrypted compressed master key M. Because of the flexibility provided by the method of the present invention, other embodiments of the invention are possible.

Referring again to FIG. 4, 206 illustrates saving the organization of prime numbers and creation of an organization key (O). The embodiment uses a small set of prime numbers and equates the set of prime numbers to factors identified below, which factors will be defined.

$$\text{Organization Key } (O) = \text{Sum of Factors} = \frac{\text{Combination of Composite Prime Products}}{\text{Set Prime Product} * \text{Sum of Quotients}}$$

Figure 5:
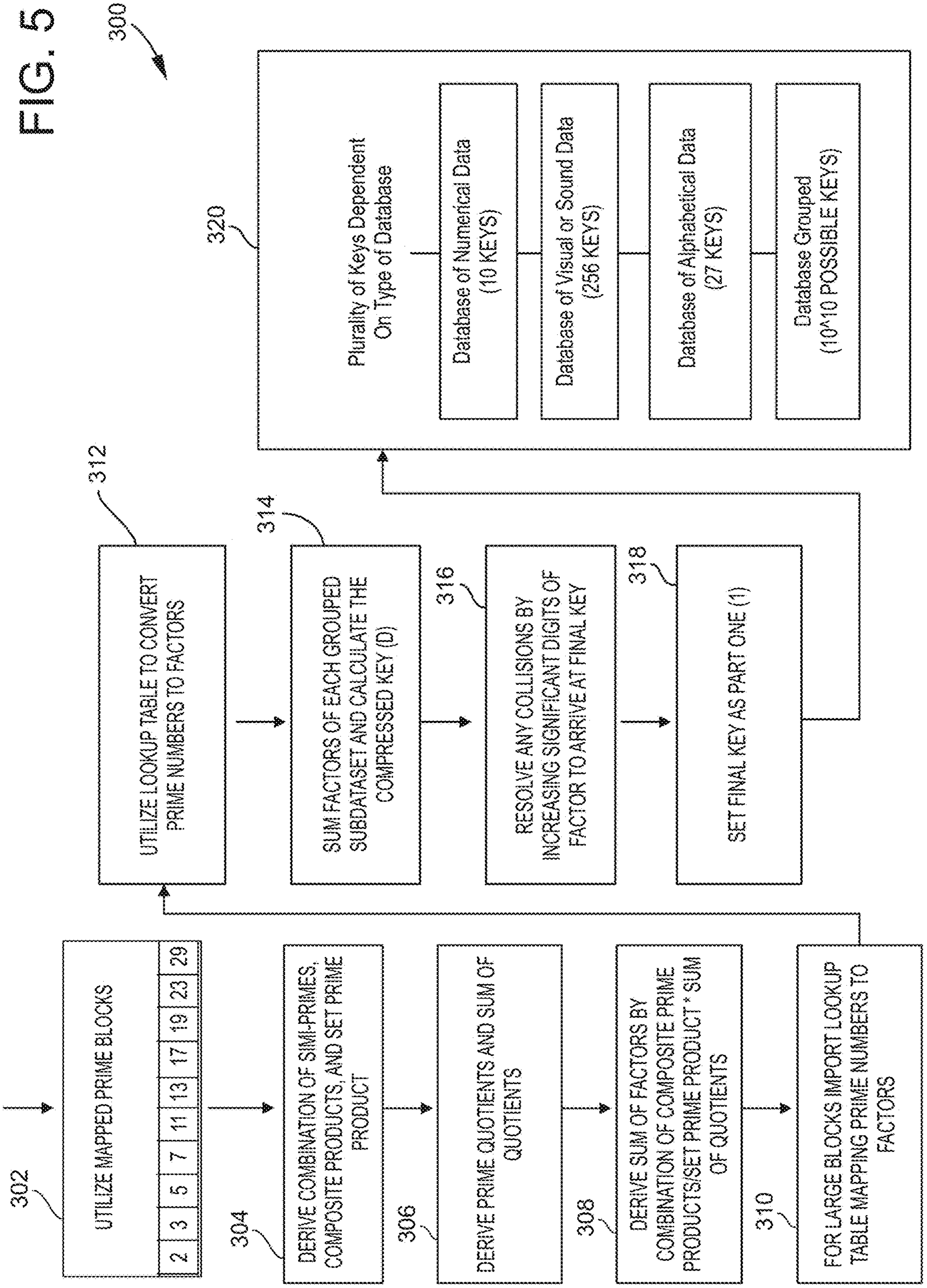
FIG. 5 illustrates in block diagram form, an embodiment of the method used to generate Part 1 of an encrypted compressed key D.

Step grouping 300 of FIG. 5 illustrates the method steps related to forming part one of the encrypted compressed key D. FIG. 5 illustrates how the encrypted data can be compressed using a trap door (one-way) function. It illustrates how a plurality of part one (1) or "first keys" are generated using the trap door direct derivation methodology. The general methodology equates the grouped prime numbers to factors as follows:

$$\text{Part 1 Key} = \text{Sum of Factors} = \frac{\text{Combination of Composite Prime Products}}{\text{Set Prime Product} * \text{Sum of Quotients}}$$

Part two (2) and part three (3) of the encrypted compressed key D add further data, if needed, to accurately derive the prime numbers of the database. Each part can be used alone or together to compress the data. Parts 2 and 3 of the encrypted compressed key D assist in the speed of finding the correct prime numbers, as will be described further.

The method described herein begins with grouping data by use and then organizing the data into a bock or blocks of data. Prime numbers are organized into a block or blocks of prime numbers. The block or blocks of data are aligned with the block or blocks of prime numbers. Then, mapping of the positional redundancy of the block(s) of data to the block(s) of prime numbers occurs, and a saving of the organization of prime numbers occurs before or after the mapping step. After the foregoing steps, an encrypted compressed key D is created based upon the mapping of the positional redundancy of the bock(s) of data to prime numbers. In addition, the present method is also directed to the formation of an encrypted organization key O and a double encrypted master key M, which is formed by merging, simultaneous or contemporaneously, the encrypted compressed key D with/to the encrypted organization key O.

The creation or generation of the part one (1) version of the encrypted compression key is illustrated in step grouping 300 including steps 302, 304, 306, 308, 310, 312, 314, 316, 318, and 320 of FIG. 5. For purposes of explanation and definition with respect to FIG. 5, the mapping of a block of organized data to a block of organized prime numbers results in a Prime Product. Dividing the Prime Product by Prime Numbers results in the Prime Quotient.

Figure 6:
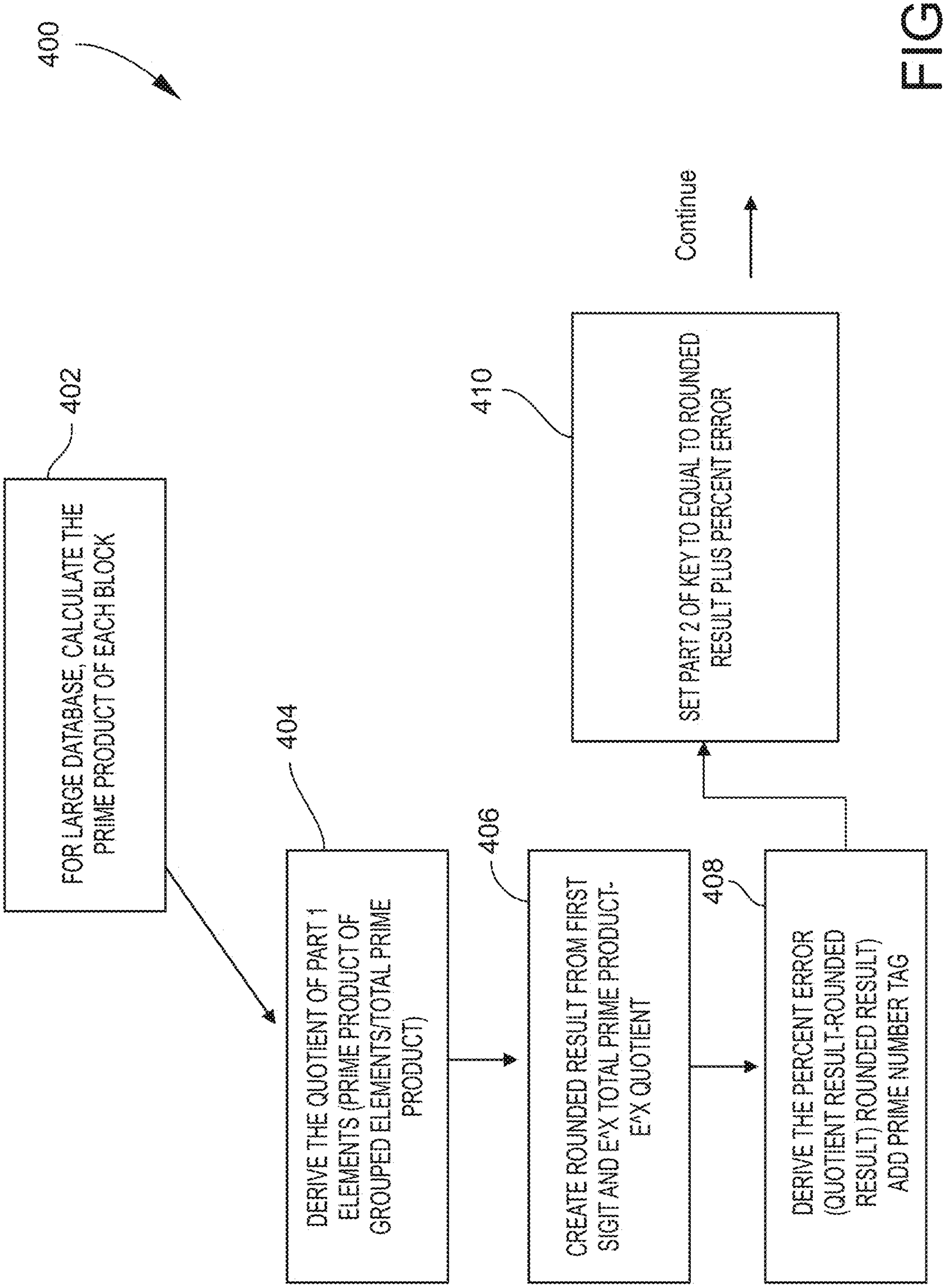
FIG. 6 illustrates in block diagram form, an embodiment of the method used to generate Part 2 of an encrypted compressed key D.

FIG. 6 describes the creation or generation of the part two (2) version of the encrypted compressed key D in steps 402, 404, 406, 408, and 410 of step grouping 400. The general methodology will be described further as will the method for generating the lookup tables to make the process proceed smoothly and efficiently.

An example of the method described herein is presented as follows. A table is made consisting of ten columns (each named Block 1, Block 2, etc.). Each block consists of 799,027 prime numbers. The table was used to compress 71,912,439 digits. For illustrative purposes, the data from Red RGB 237 is presented, which was compressed from Block 1 of the table.

The total Prime Product for Block 1 equaled 2.49 E^6, 142,993. The data for Red 237 in Block 1 included only five (5) RGB numbers, or fifteen digits. Given the small amount of data, this RGB would normally be compressed using only part 1. This example simplifies the numbers and illustrates the process used for potentially larger blocks.

The data for the Red RGB 237 block 1 is presented below as follows:

Red RGB 237, Block 1:

| Index | RGB | Prime |
|---|---|---|
| 350004 | 237 | 58886741 |
| 350005 | 237 | 58886879 |
| 375200 | 237 | 63407651 |
| 375448 | 237 | 63451631 |
| 410000 | 237 | 69672853 |
| Total Prime Product | | 9.72E+38 |

The purpose of Part 2 of the encrypted compressed key is to provide a mechanism for finding the exact Prime Product. This can be accomplished by method steps including rounding the scientific notation format of the Prime Product. For example, if the rounded Prime Product for RGB 237 is 9.0 E 38, this number can be stepped to the actual Prime Product by adding the following to the rounded Prime Product:

| Total Count | Addition | No of times | Delta Remaining |
|---|---|---|---|
| Prime Product less Rounded | | | .72E+38 |
| 1 | 8.00E+37 | 11 | 9.2E+37 |
| 2 | 8.00E+36 | 10 | 1.2E+37 |
| 3 | 8.00E+35 | 14 | 8.4E+35 |
| 4 | 8.00E+34 | 9 | 1.20E+35 |
| 5 | 8.00E+33 | 13 | 1.59E+34 |
| 6 | 8.00E+32 | 18 | 1.53E+33 |
| 7 | 8.00E+31 | 18 | 9.14E+31 |
| 8 | 8.00E+30 | 10 | 1.14E+31 |
| 9 | 8.00E+29 | 13 | 1.03E+30 |
| 10 | 8.00E+28 | 11 | 1.52E+29 |
| 11 | 8.00E+27 | 18 | 8.35E+27 |
| 12 | 8.00E+26 | 9 | 1.15E+27 |
| 13 | 8.00E+25 | 13 | 1.07E+26 |
| 14 | 8.00E+24 | 12 | 1.08E+25 |
| 15 | 8.00E+23 | 12 | 1.17E+24 |
| 16 | 8.00E+22 | 13 | 1.26E+23 |
| 17 | 8.00E+21 | 14 | 1.42E+22 |
| 18 | 8.00E+20 | 16 | 1.43E+21 |
| 19 | 8.00E+19 | 16 | 1.50E+20 |
| 20 | 8.00E+18 | 17 | 1.37E+19 |
| 21 | 8.00E+17 | 16 | 9.39E+17 |
| 22 | 8.00E+16 | 10 | 1.39E+17 |
| 23 | 8.00E+15 | 16 | 1.09E+16 |
| 24 | 8.00E+14 | 12 | 1.28E+15 |
| 25 | 8.00E+13 | 15 | 8.39E+13 |
| 26 | 8.00E+12 | 9 | 1.19E+13 |
| 27 | 8.00E+11 | 13 | 1.49E+12 |
| 28 | 8.00E+10 | 18 | 4.59E+10 |
| 29 | 8.00E+9 | 5 | 5.86E+09 |
| 30 | 8.00E+8 | 6 | 1.06E+09 |
| 31 | 8.00E+7 | 12 | 9.75E+07 |
| 32 | 8.00E+6 | 11 | 9.51E+06 |
| 33 | 8.00E+5 | 10 | 1.51E+06 |
| 34 | 8.00E+4 | 17 | 1.45E+05 |
| 35 | 8.00E+3 | 17 | 9.27E+03 |
| 36 | 8.00E+2 | 10 | 1.27E+03 |
| 37 | 8.00E+1 | 15 | 72 |

Thus, only seventy-two (72) numbers would have to be searched to find the exact Prime Product. In this example, the basic process is simplified by dividing the Prime Product for each group by the total Prime Product of all groups and converting the result to scientific notation.

In the example, the methodology would divide the Prime Product of Red 237 by the Prime Product of the block of prime numbers used. In this case, the Prime Product for this block was 2.4 E+6142993. The result of the calculation is as follows:

$$\text{Prime Product Red 237/Prime Product of block} = 9.72E+38/2.4E+6142993 = 3.90588915E-6142955.$$

At step 406 in FIG. 6, the rounded guess would be 3.0 E-6142955. The Prime Product of the block is given. The exponent of the rounded guess need only be the difference between the exponent of the block prime and the result of the calculation above. Thus, the rounded guess would be modified to 3.0 E-24 (6142979-6142955).

At step 408 in FIG. 6, the amount of error and error percentage are calculated. The result of the calculation above would be subtracted from the rounded guess as follows:

Amount of Error:

$$(3.90588915E^{\wedge}-6142955)-(3.0E^{\wedge}-6142955)=0.90588915$$

Error Percentage:

$$\%\ \text{Error} = \text{Amount of Error/Key} = .90588915/3.0 = 30.196305\%$$

At this point, Part 2 would be 32430196305. Reversal provides a Prime Product that can then be iterated to find the correct and final solution. The protocol would have to search through 30,159 possibilities to find the correct Prime Product. To find the correct number, each possibility must be checked against Part 1 of the code. Any one of the prime numbers in the RGB 237 set will return a whole number when divided into a Prime Product that includes one of the prime numbers in the set. Therefore, a tag is added to the error code that identifies the lowest prime number in the set. In this case the index number would be 350004. The protocol would first divide each of the above 30,159 possibilities by the Prime Number associated with index 350004 (58886741). If a match is found, the protocol divides the match against the entire set and checks the results against Part 1 until the correct Prime Product is found. As will be described, Part 3 further limits the search.

At step 410 in FIG. 6, Part 2 of the key would be set at 32430196305 plus the index of 350004 (32430196305350004). For the example, this process results in no more than 30 digits for Parts 1 and 2 of the key. Therefore, the method described in this example, could be used to compress duplicate data of more than three hundred (300) digits and still achieve high compression rates. For a large database, which, for example, only holds one frame of data, Parts 1 and 2 of the key can hold up to approximately 940 digits without reducing the compression rate lower than 10%. In the example, the block size was 799,027. If three RGB numbers are assumed, then the amount of data compressed by each block would be 2,397,081 digits (799027*3). A compression rate of 10% would leave room for 239,708 digits. If a key for each RGB number is obtained, then the code for each key could range up to 940 (239,708/255).

Figure 7:
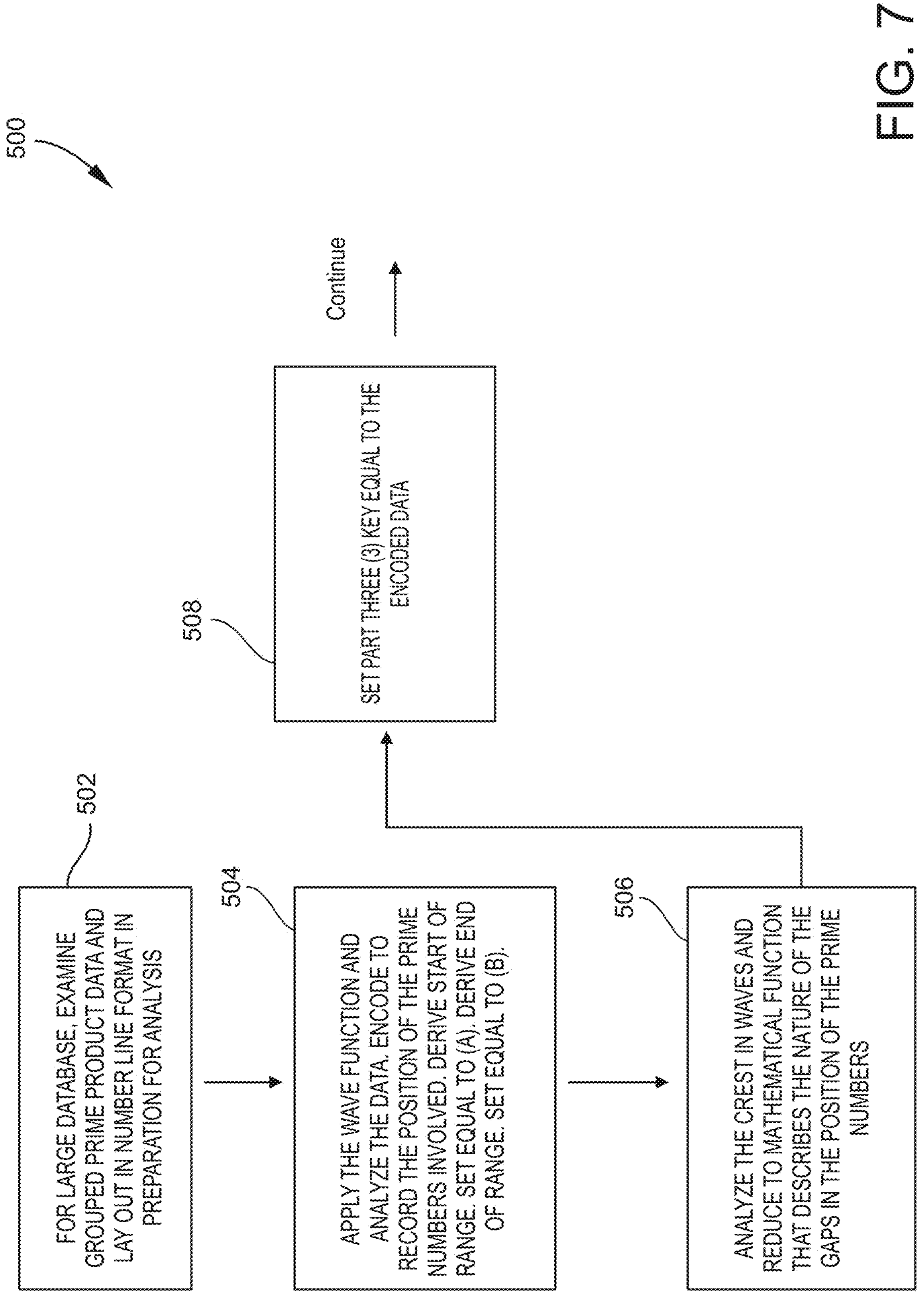
FIG. 7 illustrates in block diagram form, an embodiment of the method used to generate Part 3 of an encrypted compressed key D.

FIG. 7 discloses the grouping 500 of method steps 502, 504, 506, and 508 for creating or generating Part three (3) of the encrypted compression key D. Step grouping 500 illustrates how a Part three (3) key is generated using a direct derivation methodology. Part 3 of the encrypted compression key can be used to derive the Prime Product needed for reversal, or to speed up reversal of Parts 1 and Part 2.

As disclosed in FIG. 7, the method steps map the actual energy, or quantum mechanisms, that the position of each prime number and each duplicate digit, holds along the number line.

A simple example is presented below by referring again to the example of RGB 204. Step 502 of FIG. 7 lays out the data of each block along a number line using the following methodology. The table below presents only the index, RGB number, and associated Prime Numbers in a block of ten (10) prime numbers.

| Index | RGB | Prime |
|---|---|---|
| 0 | 202 | 2 |
| 1 | 205 | 31 |
| 2 | 204 | 73 |
| 3 | 204 | 127 |
| 4 | 206 | 179 |
| 5 | 207 | 233 |
| 6 | 204 | 283 |
| 7 | 204 | 353 |
| 8 | 205 | 419 |
| 9 | 205 | 467 |

If the data above is presented along a number line, the data would appear as follows:

| Index | 0 | 1 | 2 | 3 | 4 | 5 | 6 | 7 | 8 | 9 |
|---|---|---|---|---|---|---|---|---|---|---|
| 204 RGB | | | | 204 | 204 | | | 204 | 204 | |
| Prime | | | | 73 | 127 | | | 283 | 353 | |

At step 504 of FIG. 7, the method applies a wave function to the data of the block. A wave is applied to each duplicate set of numbers, in this example RGB numbers. The wave gives definition to the pattern of the RGB numbers producing the Prime Product for each subgroup or duplicate. The wave pattern used in the example was a sine wave, but any type of wave pattern or like function can be used to describe the energy caused by the position of the numbers. The following is an example of a sine wave applied to the above data.

At step 506, the wave is analyzed and each crest of the wave is reduced to a function or mathematical equation that describes the start and end positions of the duplicate RGB number and their position along the number line. In this example, the code would be reduced to communicate a start of the data at index three (3), a run of two (2) numbers, a break of two (2) index numbers, and a final run of two (2) numbers.

Several mathematical formulations can be used to encode the wave function associated with Part 3. The method step includes any mathematical formulation that places the results in a key and is used to derive or check the Prime Product and then use this number to locate the position of redundancies. Finally, at step 508, the data resulting from the mapping is set as Part 3 of the key.

Figure 8:
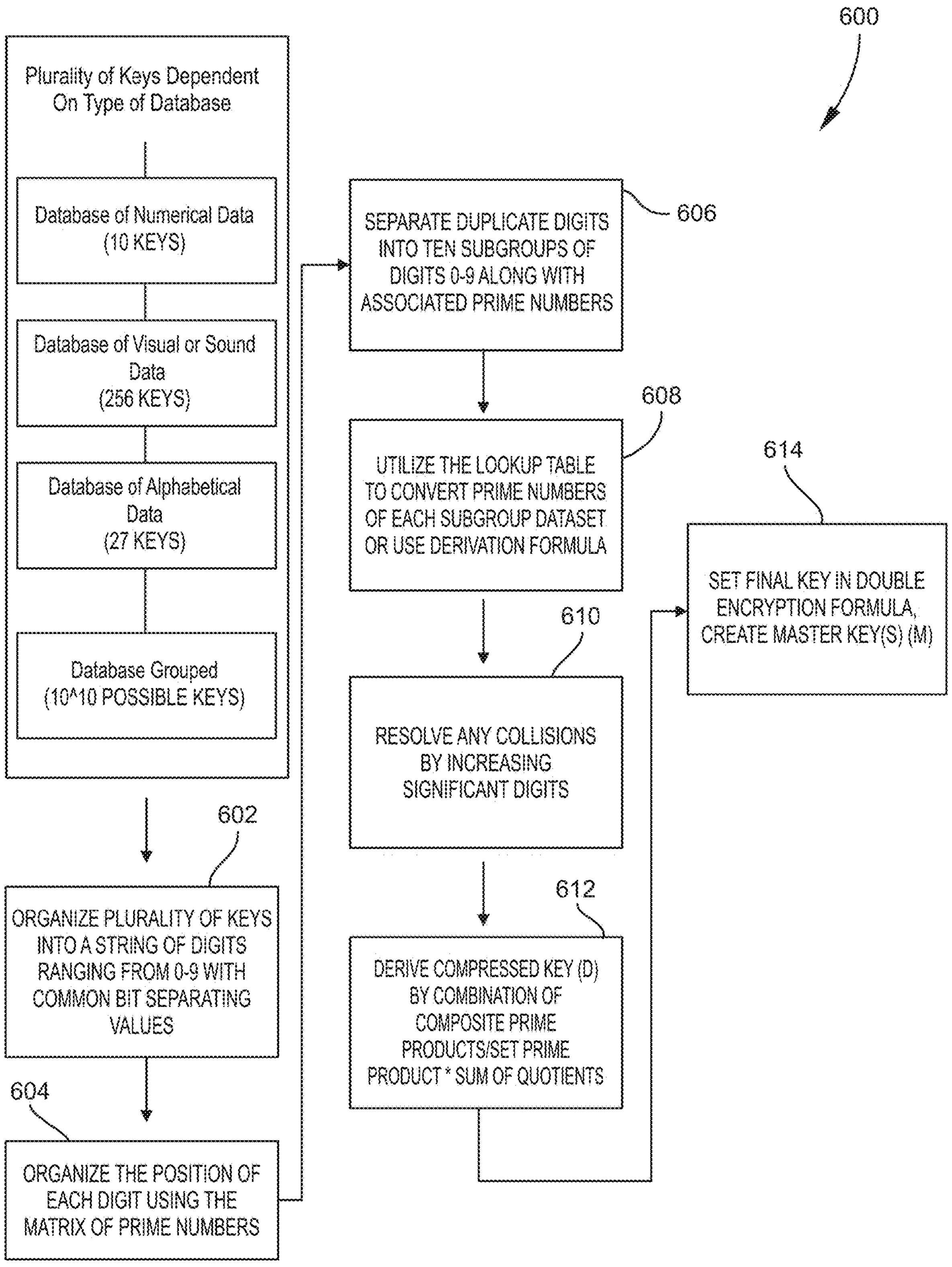
FIG. 8 illustrates in block diagram form, an embodiment of the method used to generate Part 1 of the final compressed key D and the double encrypted master key M.

FIG. 8 illustrates step grouping 600 for creating or generating Part one (1) of the final keys D or M. The method steps 602, 604, 606, 608, 610, 612, and 614, set forth in FIG. 8, are an iteration of and supplement to the method steps set forth in FIG. 5. FIG. 5 relates to the formation of an encrypted compression key D. FIG. 4 refers to saving prime numbers and creating an encrypted organization key O. The organization of prime numbers is used in both the deriving of an encrypted compression key D and an encrypted organization key O. A double encrypted master key M, referred to at 614 in FIG. 8, is formed by merging the encrypted compression key D to the encrypted organization key O. This provides simultaneous or contemporaneous compression and encryption for any database.

For example purposes with respect to FIG. 8, the digits of the first key are in essence iterated through the methodology to reduce the remaining digits to ten (digits 0-9) plus the code required to check the accuracy of the derivation.

Using the example, Step 602 of FIG. 8 would include organization of a plurality of first keys into a string of digits ranging from 0-9 with a common bit separating the values. The first keys could also be placed into a standard length for coding.

Again using the example, step 604 maps the digits through the matrix of prime numbers as described previously. At step 606 the methodology separates the data into ten (10) datasets for each duplicate digit. At step 608, a lookup table is utilized to find the factors needed for Part 1 of the final key. At step 610, collisions are resolved and the significant digits of the final number are determined. At Step 612, the encrypted compressed key (D) is derived. Finally, at step 614, Part 1 of the final key is set.

Figure 9:
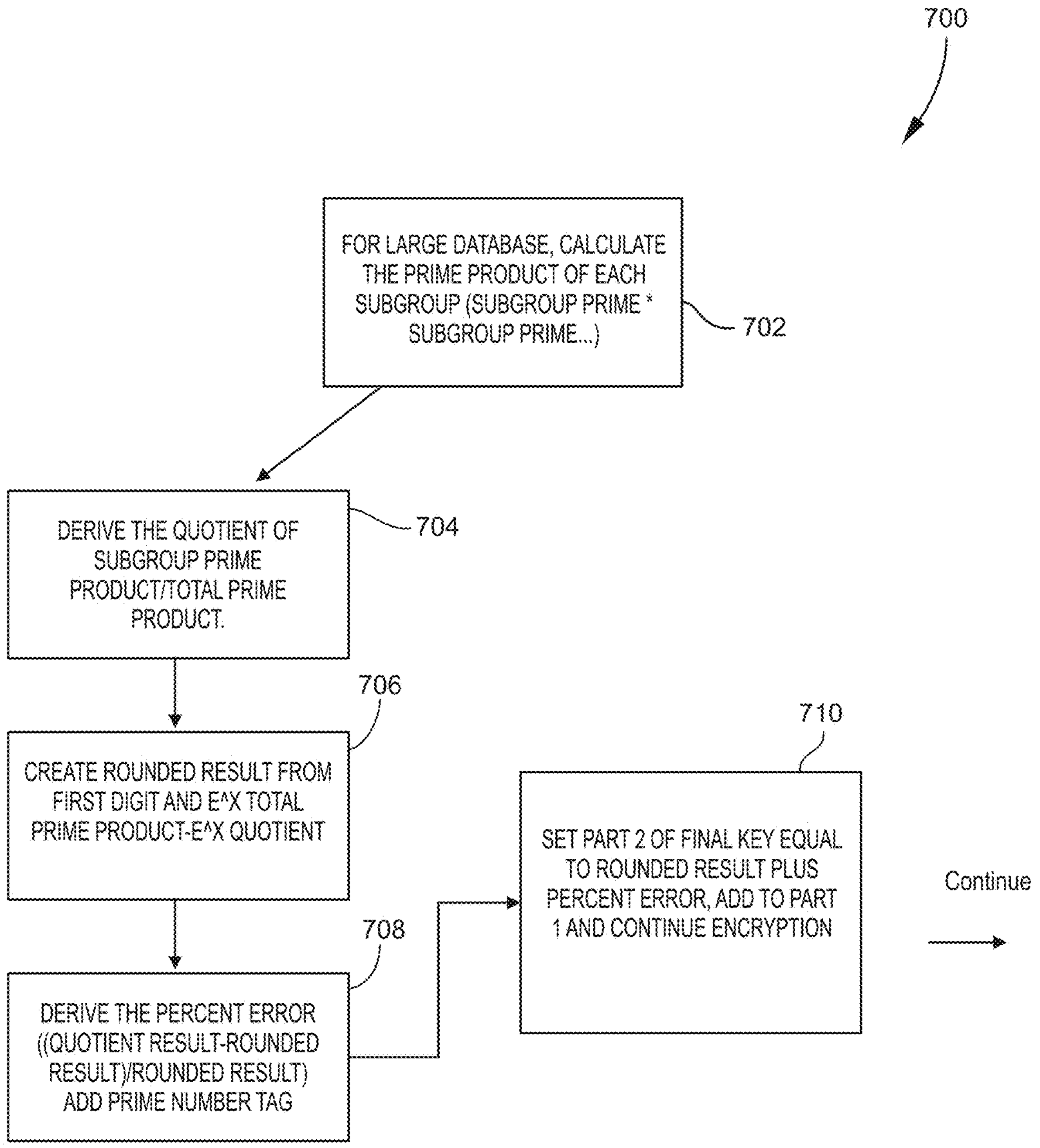
FIG. 9 illustrates in block diagram form, an embodiment of the method used to generate Part 2 of the final keys D and M.

FIG. 9 illustrates the step grouping 700 including steps 702, 704, 706, 708, and 710. FIG. 9 illustrates how the methodology generates Part two (2) of the final keys D or M. The steps in FIG. 9 are, in essence, an iteration of the methodology described with respect to FIG. 6.

At step 702, and again using the example, the method derives the Prime Product of each of the final 10 subgroups (digits 0-9). At step 704, the Prime Quotient for each subgroup is derived. At step 706, the result is rounded to significant digits and the error percentage is derived. At steps 708 and 710, Part two (2) of the final keys is set.

Figure 10:
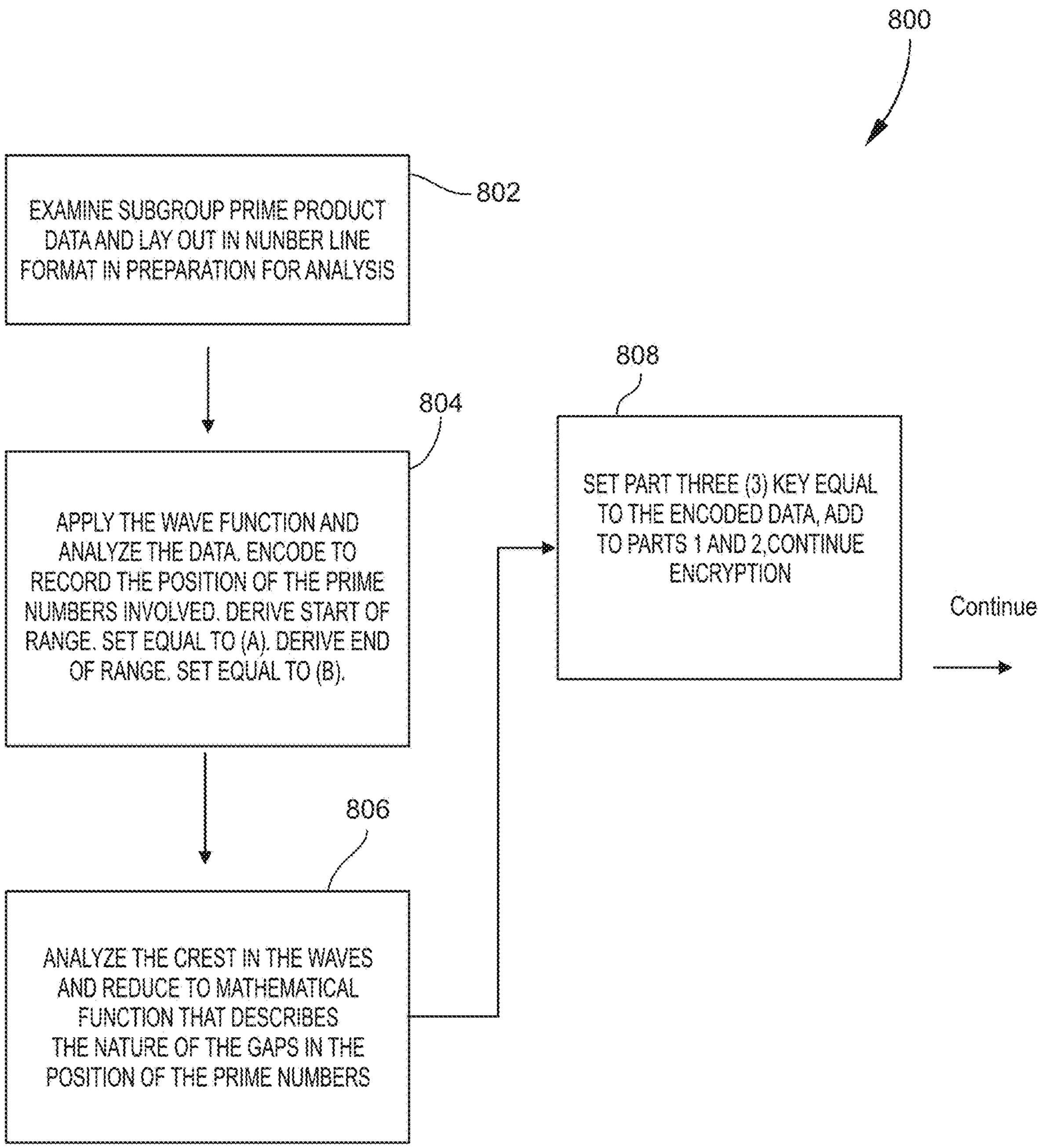
FIG. 10 illustrates in block diagram form, an embodiment of the method used to generate Part 3 of the final keys D and M.

FIG. 10 illustrates the step grouping 800, including steps 802, 804, 806, and 808. FIG. 10 illustrates the creation or generation of Part three (3) of the final key(s) D or M using a direct derivation methodology. At step 802, the subgroup of prime numbers is examined and laid out in number line format as previously described. At step 804, wave functions are applied to the data, and the data is encoded to record the position of the prime numbers within the dataset. At step 806, the crests of the waves are analyzed and gaps in the range are encoded into variables. At step 808, the variables are combined and set as Part 3 of the key.

The encrypted compressed key(s) D and the organization key(s) O can be merged, applied, or combined into a double encrypted master key M. Both keys (D and O) are compressed using the compression derivation methodology described herein. A trap door function, that is automatic with the present method, is used to create the encrypted compressed key(s) D, and a second trap door function is used to create the compressed organization key(s) O. The master key(s) M includes both the encrypted compressed key(s) D, the encrypted compressed organization key(s) O, and the use of the natural trap door functionality that occurs from mapping the data to prime numbers and saving the organization of the prime numbers.

The process of combining key(s) D and O can involve the use of an Asymmetric or Symmetric process. Use of Asymmetric encryption in the present method results in the creation of a public and private master key (M-public and M-private). In essence, the "double encryption" occurs as a result of mapping the data to prime numbers and saving the organization of prime numbers, which, combined with the trap door functionality, allows the simultaneous or contemporaneous joining or merger of the compression methodology to one of the alternative encryption processes.

The compressed encrypted key(s) D and the master key(s) M include one or more parts, e.g., Parts 1, 2, or 3. For smaller databases, the key(s) D and M may only include one part, and for larger databases, an additional part or parts may be included. The usage of the parts provides enhancements for the D and M key(s) with respect to speed and accuracy.

The method disclosed herein compresses by derivation instead of mathematical manipulation, since manipulation may result in a loss of data. Unique to the present method is the fact that the original database is deleted in its entirety prior to transmission and then recreated after transmission with little loss of information. The method uses prime numbers to map or organize a database, even a chaotic or random database, and then uses the properties of prime numbers to recreate or derive the database. Prime numbers are not used to mathematically alter the database. Rather, prime numbers are used to locate the position of redundant elements in the database and they are used to scramble and thus encrypt the database.

The method disclosed herein uses a novel approach to prime factorization. Instead of directly calculating a prime factorization solution, the disclosed method uses a derivation methodology that relies on the three part key(s) previously described. The key parts provide a mechanism for reversing the methodology and recreating the database. Part one (1) of the key(s) mathematically equates prime numbers to factors that are in turn converted to a compressed key(s). Part two (2) uses a rounded guess and error percentage to reverse the method. Part 3 maps the energy or quantum mechanisms of the actual pattern produced by each subgroup of prime numbers and their related Prime Products. Thus, part three (3) maps the energy or pattern of factorization and places the results in a key that is communicated across the process. This accelerates the process and improves accuracy during the compression of large databases.

Figure 11:
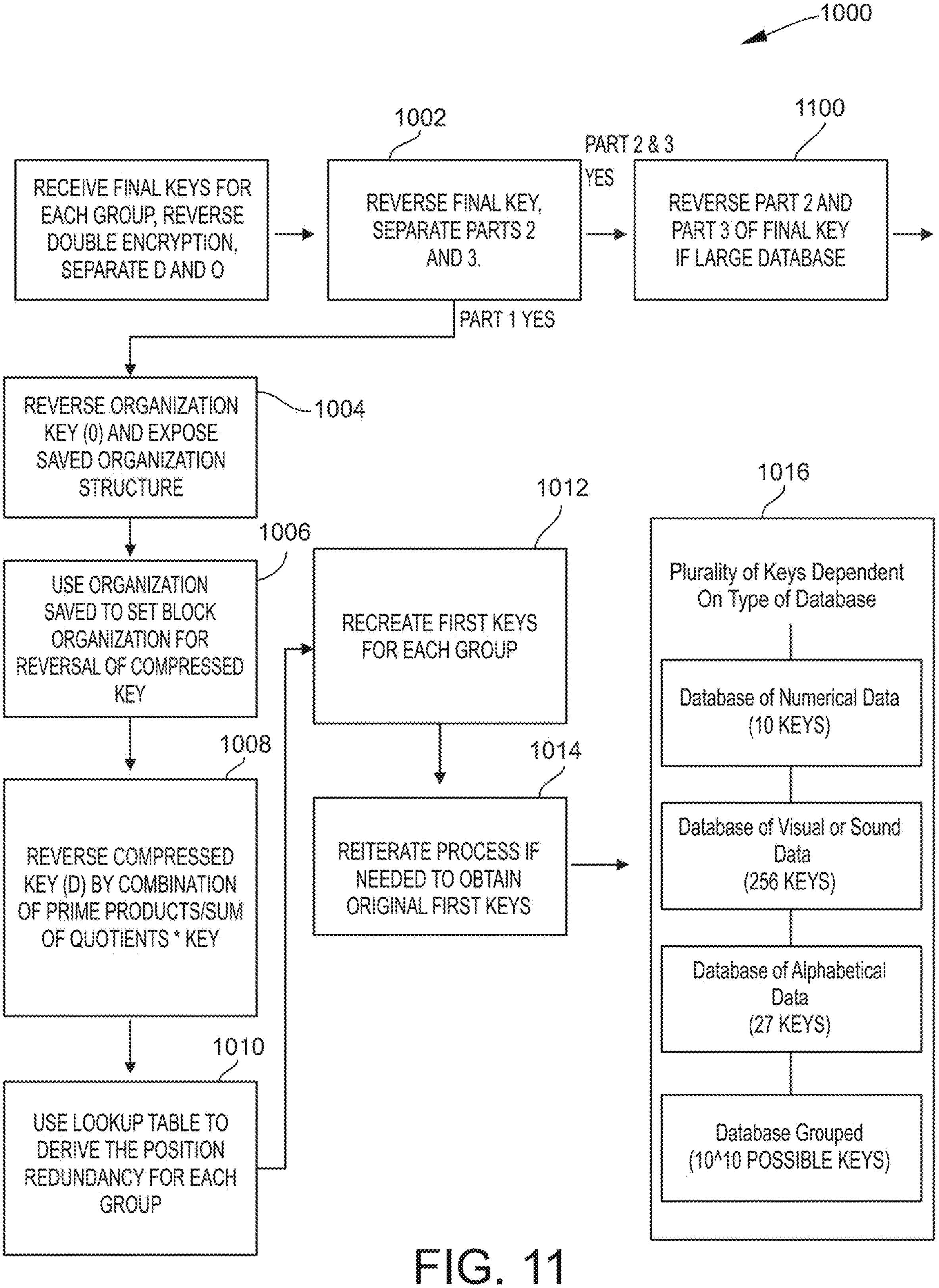
FIG. 11 illustrates in block diagram form, an embodiment of the method used to reverse the final key(s), including keys M and D, and the organization key O.

FIG. 11 illustrates step grouping 1000 including steps 1002, 1004, 1006, 1008, 1010, 1012, 1014, and 1016. FIG. 11 illustrates how the methodology may begin the process of reversing the M or D or O keys to obtain the original database. The methodology first reverses the final key using a derivation equation. At step 1002, the methodology begins the process of reversing Part 1 of the key and separates out Parts 2 and 3.

The reversal method in this example begins at step 1002 by using the private key decryption function (D=Z^F mod O), and methodology described previously, which uncovers keys D and O.

At step 1004, the organization key O is reversed and the saved organization structure is exposed to derive the encrypted compressed key D. At step 1006, the organization is used to set the block organization needed to reverse key D.

At step 1008, key D is reversed using the following direct derivation formula:

$$\text{Set Prime Product} = \frac{\text{Combination of Composite Prime Products}}{D * \text{Sum of Quotients}}$$

The process moves forward from Step 1010 through 1016 to recreate the first key(s) of each block or blocks of data. The first keys are grouped in the same order the database held originally. If the database is large, and the block of prime numbers used is large, then the process utilizes Parts 2 and 3 of the final key(s) to derive the Prime Product of each subgroup. FIG. 11 is applicable for the reversal of Part 1 of the M, D, and O keys.

Figure 12:
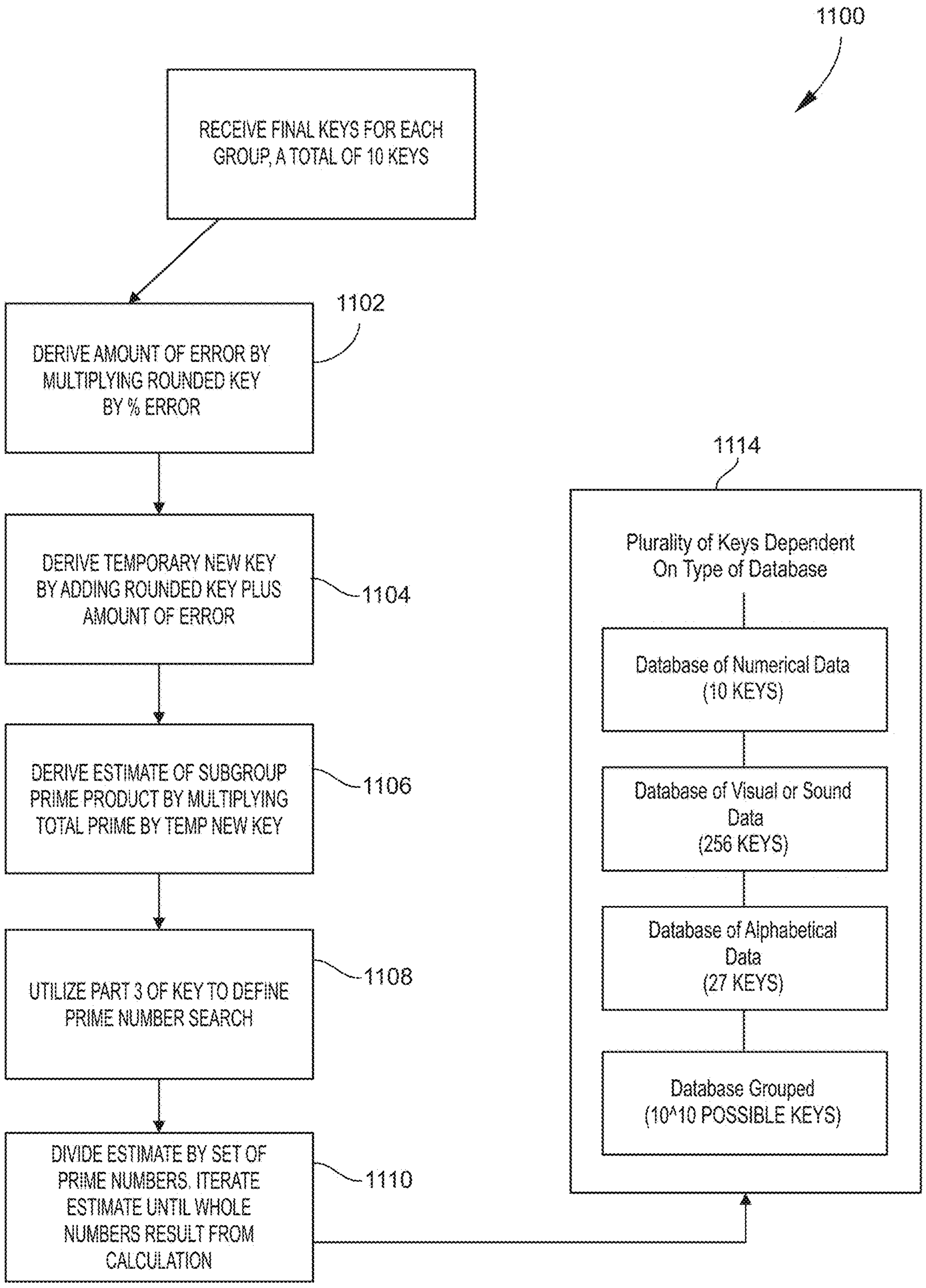
FIG. 12 illustrates in block diagram form, an embodiment of the method used to reverse Parts 2 and 3 of the final key(s) M and D.

FIG. 12 illustrates step grouping 1100 including steps 1102, 1104, 1106, 1108, 1110, and 1114. FIG. 12 illustrates reversing Parts 2 and 3 of the final key D or M. At step 1102, the amount of error is derived by multiplying the rounded key by the percent error. At step 1104, a temporary new key is obtained by adding the rounded key plus the amount of error. At step 1106, an estimate of the subgroup Prime Product is derived by multiplying the total Prime Product by the temporary new key.

At step 1108, Part 3 of the key is utilized to define the prime numbers included in the search for a final solution. At step 1110, the estimate of the subgroup Prime Product is divided by the index of the first Prime Product in the set, and then all of the prime numbers identified in the search set, until whole numbers result from the calculation.

Figure 13:
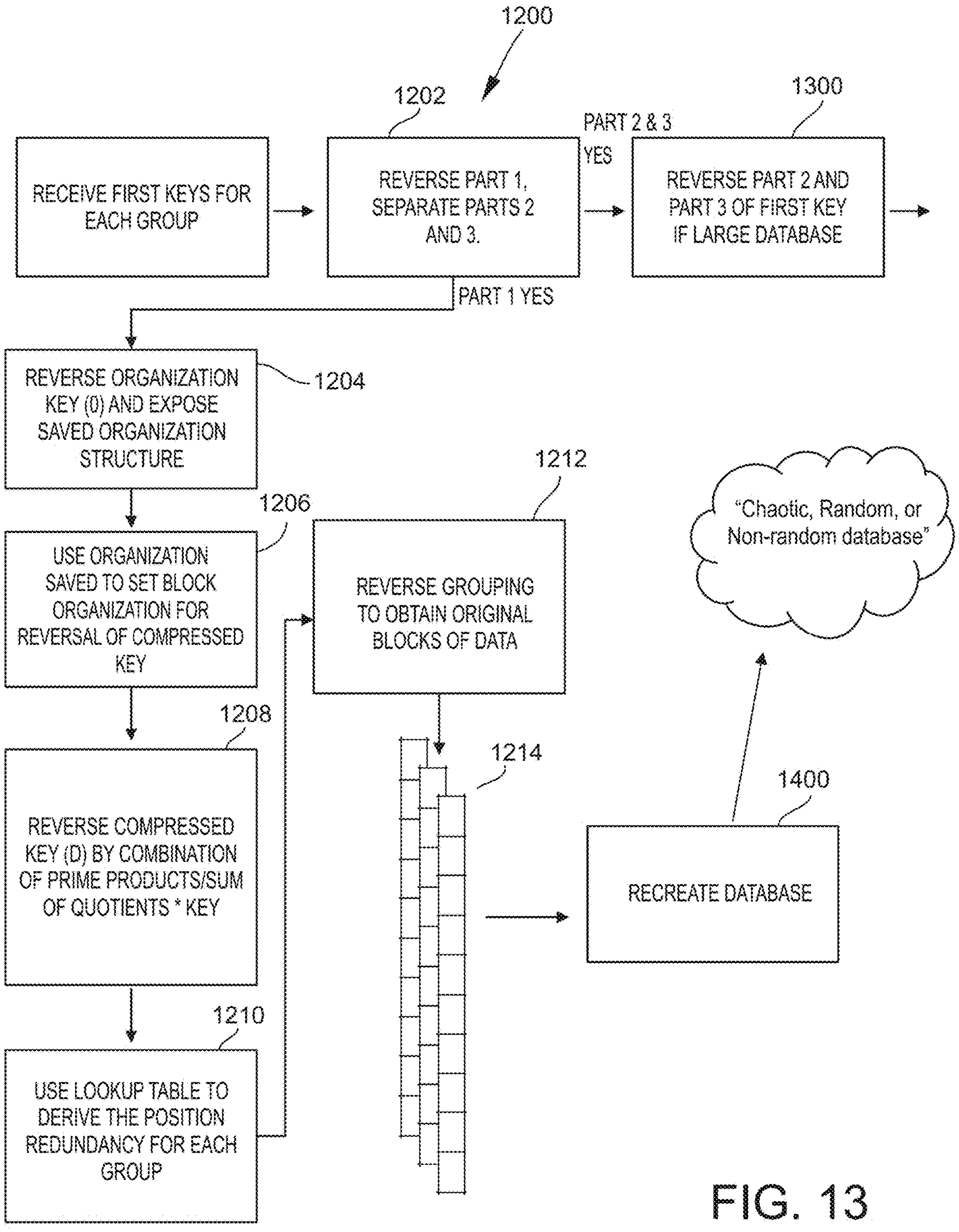
FIG. 13 illustrates in block diagram form, an embodiment of the method used to reverse part 1 of the first key(s) relating to keys M, D, and O.

FIG. 13 is a schematic illustration of the interaction of step groupings 1200, 1300, and 1400 for the purpose of reversing Part one (1) of the keys M, D, or O. Step grouping 1200 includes steps 1202, 1204, 1206, 1208, 1210, 1212, and 1214. Groupings 1200, 1300, and 1400 demonstrate how the methodology reverses the first keys to obtain the original database. FIG. 13 is, in essence, an iteration of FIG. 11.

At step 1202, Part 1 of the key(s) is separated from Parts 2 and 3. At step 1204, the organization key O is reversed which exposes the organization used to derive the encrypted compressed key D. At step 1206, the organization is used to set the block organization needed to reverse key D.

At step 1208, encrypted compressed key D is reversed using the following direct derivation formula:

$$\text{Set Prime Product} = \frac{\text{Combination of Composite Prime Products}}{D * \text{Sum of Quotients}}$$

At steps 1210, 1212, and 1214, the groups and blocks of prime data are reconstituted, and if no Parts 2 or 3 exist, the mapping of the data is reversed and the database is recreated.

Figure 14:
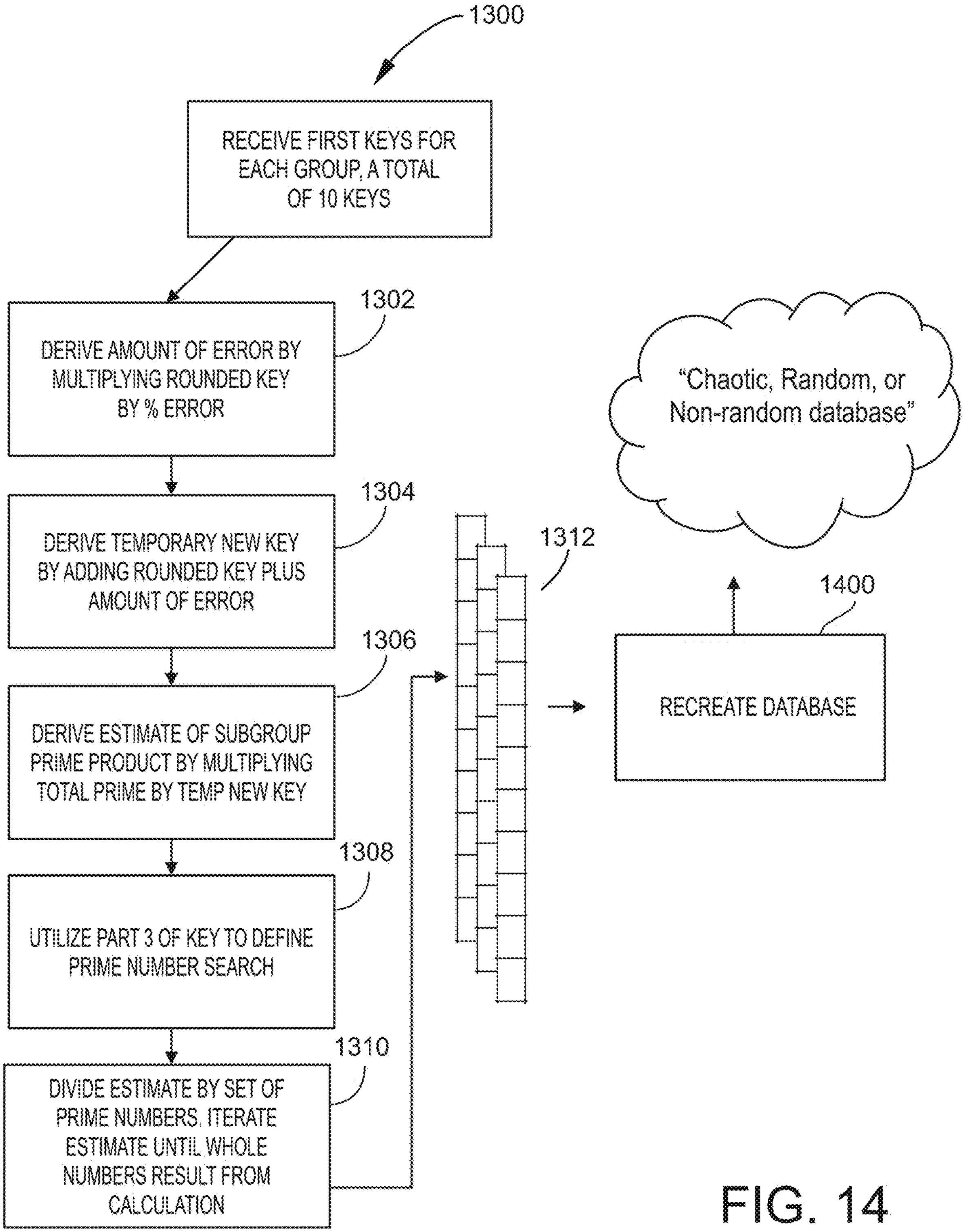
FIG. 14 illustrates in block diagram form, an embodiment of the method used to reverse Parts 2 and 3 of the first key(s) relating to keys D and M to recreate the database.

FIG. 14 is a schematic illustration of the interaction of set groupings 1300 and 1400 for the purpose of reversing Parts (2) and (3) of keys M or D. FIG. 14 illustrates reversing Parts 2 and 3 of the first key if these components exist. At step 1302, the amount of error is derived by multiplying the rounded key by the percent error. At step 1304, a temporary new key is obtained by adding the rounded key plus the amount of error. At step 1306, an estimate of the subgroup prime product is derived by multiplying the total Prime Product by the temporary new key.

At step 1308, Part 3 of the key is utilized to define the prime numbers included in the search for a final solution. At step 1310, the estimate of the subgroup Prime Product is divided by the index of the first prime number in the set and then by all the prime numbers identified in the set until whole numbers result from the calculation. The potential Prime Product is compared with Part 1 of the code. If the two sums match, then the subgroup Prime Product is identified.

The database can be recreated by using the index to locate the position of each duplicate within the database. Because neither the numbers of the database, or the duplicates themselves, have been multiplied, the database can be recreated with accuracy.

Figure 15:
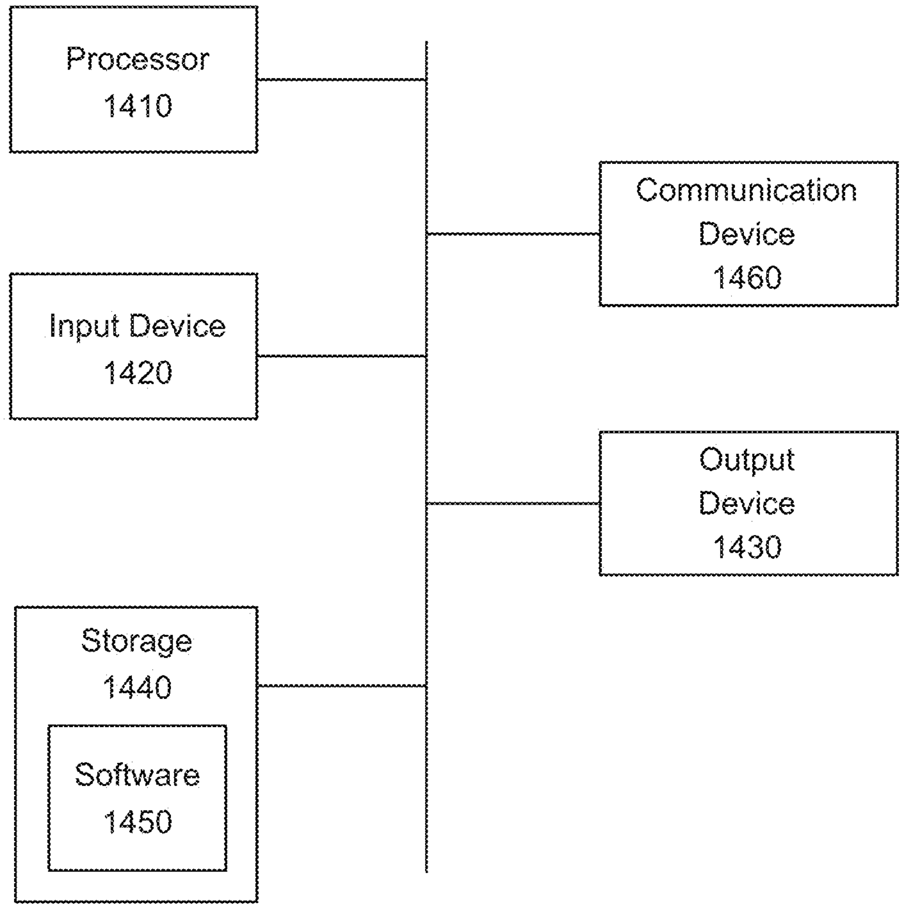
FIG. 15 illustrates in block diagram form, a communications system in accordance with the present invention.
Figure 16:
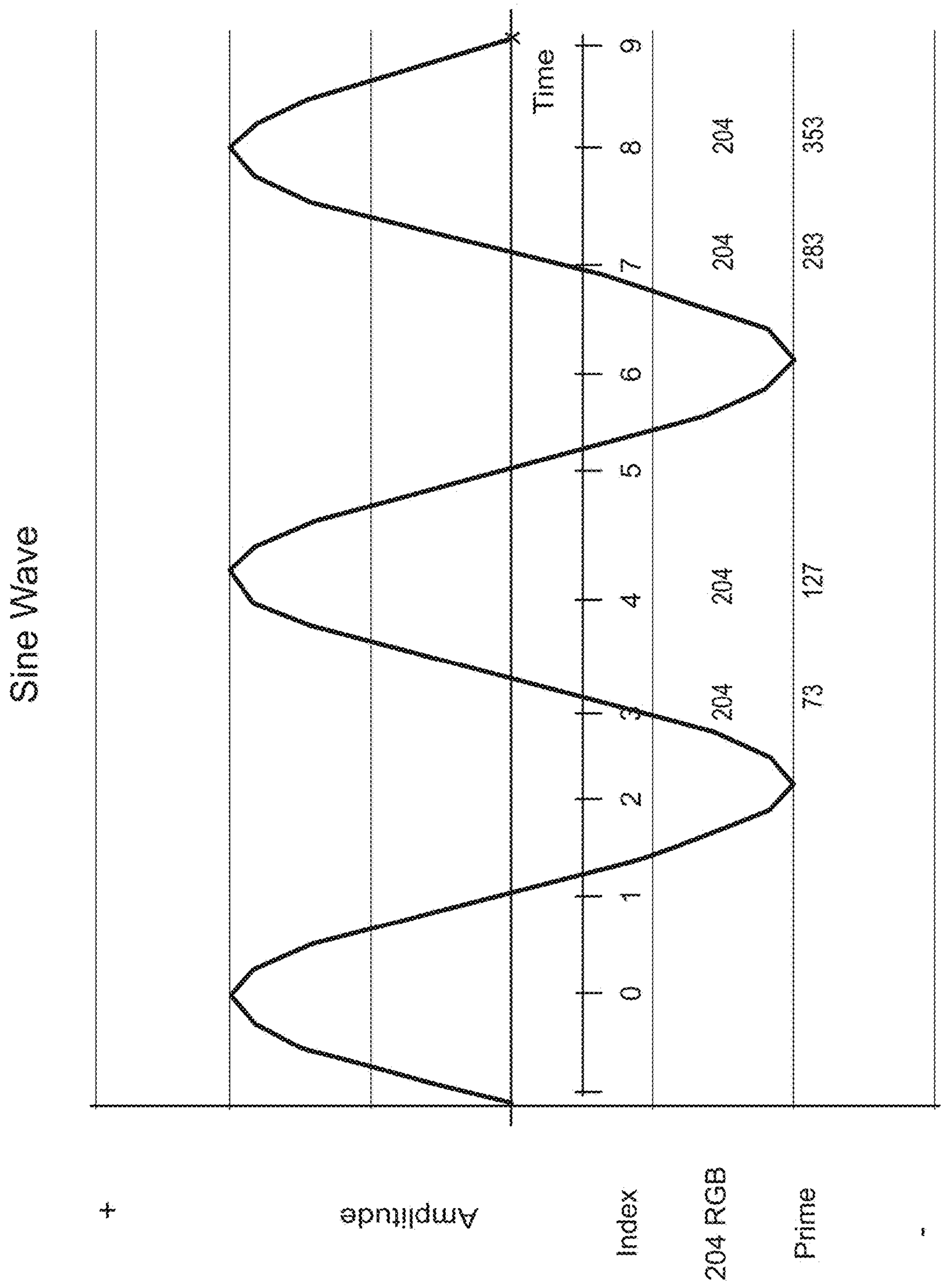
FIG. 16 illustrates an example of a sine wave applied to data.

FIG. 15 illustrates an example of a computing system that can be used to compress and encrypt a file, such as an image file, according to the principles described herein. The system can be a computer connected to a network, including a local area network and/or a wide area network. The system can be a client or a server. As shown in FIG. 15, the system can be any suitable type of processor-based unit, such as a personal computer, workstation, server, handheld computing device, phone, tablet, or dedicated device. The system can include, for example, one or more of input devices 1420, output devices 1430, one or more processors 1410, storage 1440, software 1450, and communication device 1460. Input device 1420 and output device 1430 can generally correspond to those described above and can either be connectable or integrated with the computer.

Input device 1420 can be any suitable device that provides input, such as a touch screen, keyboard or keypad, mouse, or voice-recognition device. Output device 1430 can include any suitable device that provides output, such as a display, touch screen, haptics device, virtual/augmented reality display, or speaker.

Storage 1440 can be any suitable device that provides storage, such as an electrical, magnetic, or optical memory including a RAM, cache, hard drive, removable storage disk, or other non-transitory computer readable medium. Communication device 1460 can include any suitable device capable of transmitting and receiving signals over a network, such as a network interface chip or device. The components of the computing system can be connected in any suitable manner, such as via a physical bus or wirelessly.

Processor(s) 1410 can be any suitable processor or combination of processors, including a central processing unit (CPU), graphics processing unit (GPU), field programmable gate array (FPGA), and application-specific integrated circuit (ASIC). Software 1450, which can be stored in storage 1440 and executed by one or more processors 1410, can include, for example, the programming that embodies the functionality of the present disclosure (e.g., as embodied in the devices as described above). Software 1450 can include one or more programs for execution by one or more processor(s) 1410 for performing one or more of the steps of the method claimed herein.

As described, the method disclosed herein begins by organizing a selected original database into a block or blocks of data. The disclosed method is usable with any database including those containing pictures, video, text, voice, or any other type of information. As described, the next steps are to organize prime numbers into block(s) of prime numbers and align the block(s) of data with the block(s) of prime numbers. Mapping the positional redundancy of the block(s) of data to the block(s) of prime numbers is an important step in the method. Saving the organization of the prime numbers is also important and this step may occur either before or after the mapping step. In essence, data is mapped to prime numbers based on the positions of redundant data in the dataset. The properties of prime numbers are then used to create unique keys that can be reversed mathematically. Encryption occurs automatically from mapping the data to prime numbers and saving the organization of prime numbers.

The foregoing method steps are foundational for the method because they allow the creation or derivation of the encrypted compression key D as well as the creation or derivation of the encrypted compressed organization key O. The foregoing method steps are also foundational to the method for creating the double encrypted master key M. A trap door functionality results from the basic method steps. The integration or merger of the unique compression formula, which automatically encrypts, to a known encryption formula, creates the master key M. Thus, the present method, simultaneously or contemporaneously, adds encryption to the compression process, adds compression to the encryption process, and uses a trap door functionality to permit the integration or merger of the encrypted compression key D with the encrypted compressed organization key O to form the double encrypted compressed master key M.

The saved organization of prime numbers is uniquely used for many functions. It is used during the formation of the encrypted compression key(s) D, and it is also used during the formation of the encrypted compressed organization key(s) O. Similarly, a trap door function occurs during the creation of the encrypted compressed key D, and a second trap door function occurs and is used in the creation of the encrypted compressed organization key O. By using a trap door functionality in conjunction with the saved organization of prime numbers, the encrypted organization key(s) O is merged or joined simultaneously or contemporaneously with the encrypted compression key(s) D to create the double encrypted compressed master key(s) M.

As described, the master key(s) M can be double encrypted by applying a modification of either known asymmetric or known symmetric encryption. The use of asymmetric encryption results in the creation of a public and private master key (M-public and M-private). The use of asymmetric encryption in the formation of the encrypted compressed organization key(s) O and the master key(s) M eliminates the need for a password. As described previously, the encrypted compressed key D and the master key M also include one or more parts, i.e., Parts 1, 2, and 3, to provide enhancement with respect to speed and accuracy.

The preferred way for organizing original data, grouped by use, is to place the data into a matrix of columns and rows of data of known size without changing the order of placement. Mapping the positional redundancy of the blocks of data to the blocks of prime numbers preferably means mapping the position of each duplicate element in the blocks of data to an element of the organized prime blocks. The organization of prime numbers into a block(s) of prime numbers means organizing the prime numbers as either increasing, decreasing, or non-duplicative. Saving the organization of prime numbers preferably means converting the organization of prime numbers into number(s) from which the organization can be derived. The trap door function discussed herein means a one-way functionality.

An extension of the disclosed method provides for the combination of two or more distinct databases into one or more unique encrypted and compressed "embedded" key(s). For example, it is known in artificial intelligence to utilize embeddings. Embeddings enable similarity searches and are foundational for artificial intelligence. Word embeddings are a way of representing words as vectors, where the distance and direction between vectors reflect the similarity and relationships among the corresponding words. Image or picture embeddings are a numerical representation of images or pictures that are encoded into a vector representation. Embeddings are numerical representations of words, images, or videos in a form that computers can process. They are used in machine learning and training models and search engines. As will be described with respect to an embodiment directed to artificial intelligence, the present invention provides a method for combining multiple databases, such as, for example, words and pictures, into a unique encrypted and compressed embedded key.

In the embodiment to be described, the word "apple" is associated with a picture of apples. For the described embodiment, the initial step is the creation of two prime databases. The following steps are performed for the word "apple" and repeated separately for the picture of apples. Organize the original data; organize prime numbers; align the data with the prime numbers; save the organization of prime numbers; and map the data to the prime numbers.

A first prime database is formed for characters (exp index 0 to 1000), and a second prime database is formed for pictures (exp index 1001 to 800,000 prime numbers). The character (word) is converted to numbers, and the numbers are converted to primes using the character (word) database. The primes are then multiplied to create a unique Prime Product for each word.

Similarly, the pixels of the picture(s) are converted to RGB numbers. The RGB numbers are then mapped to the picture database. The pixels for each picture are then grouped, and the Prime Product for each picture is derived.

An encrypted organization key for the word "apple", and an encrypted and compressed key for the word "apple", are generated. Further, an encrypted compressed master key for the word "apple" is created from joining the encrypted and compressed key with the encrypted organization key. In a similar manner, an encrypted compressed master key for the picture of apples is created. The encrypted master key for the word "apple" is joined with the encrypted master key for the picture of apples to form an encrypted and compressed embedded key that includes the numerical representations of the word "apple" and the picture of apples.

The resulting encrypted and compressed embedded key includes two parts and two numerical representations, i.e., (exp. Word—apple, picture 1); Word—apple, picture 2, etc.). Having the Prime Products, for the word "apple" and the pictures of apples, associated with each other, within the embedded key, provides advantages related to efficiency and accuracy with respect to the use of the two example databases in artificial intelligence.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method of encryption and compression comprising:

organizing prime numbers for multiple databases;

saving the organization of prime numbers for each database;

generating multiple encrypted organization keys;

creating multiple encrypted and compressed keys;

generating multiple encrypted compressed master keys by merging each encrypted and compressed key with an organization key wherein encryption and compression being created simultaneously or contemporaneously within each encrypted compressed master key;

forming at least one encrypted and compressed embedded key by joining the encrypted compressed master keys;

deleting the databases;

reversing and decompressing all encrypted and compressed embedded keys; and recreating the multiple databases.

2. A method of encryption and compression comprising:

creating multiple encrypted and compressed keys based upon multiple databases;

generating multiple encrypted organization keys;

generating multiple encrypted compressed master keys by merging each encrypted and compressed key with an organization key;

generating an encrypted and compressed embedded key by joining the encrypted compressed master keys;

deleting the databases;

reversing and decompressing the encrypted and compressed embedded keys key; and recreating the multiple databases.

* * * * *